United States Patent
Lange et al.

(10) Patent No.: US 8,232,439 B2
(45) Date of Patent: Jul. 31, 2012

(54) USE OF ISOALKANE MIXTURES FOR DEDUSTING CONSTRUCTION CHEMISTRY PRODUCTS

(75) Inventors: Arno Lange, Bad Duerkheim (DE); Klaus Seip, Ludwigshafen (DE); Ulf Dietrich, Wachenheim (DE); Rainer Papp, Speyer (DE)

(73) Assignee: BASF SE, Ludwigshafen (DE)

( * ) Notice: Subject to any disclaimer, the term of this patent is extended or adjusted under 35 U.S.C. 154(b) by 227 days.

(21) Appl. No.: 12/602,187

(22) PCT Filed: May 30, 2008

(86) PCT No.: PCT/EP2008/056710
§ 371 (c)(1),
(2), (4) Date: Nov. 30, 2009

(87) PCT Pub. No.: WO2008/145738
PCT Pub. Date: Dec. 4, 2008

(65) Prior Publication Data
US 2010/0186636 A1    Jul. 29, 2010

(30) Foreign Application Priority Data
May 31, 2007    (EP) ..................................... 07109344

(51) Int. Cl.
*C07C 9/22* (2006.01)
*C07C 2/08* (2006.01)
*C04B 24/00* (2006.01)

(52) U.S. Cl. ............ 585/16; 585/18; 585/510; 585/511; 106/802; 106/807

(58) Field of Classification Search ................ 585/16, 585/18, 510, 511; 106/802, 807
See application file for complete search history.

(56) References Cited

U.S. PATENT DOCUMENTS

| | | | |
|---|---|---|---|
| 2,898,387 A | 8/1959 | Teter | |
| 3,202,723 A | 8/1965 | Thonon et al. | |
| 3,244,644 A | 4/1966 | Stiles | |
| 3,597,489 A | 8/1971 | Vu et al. | |
| 3,917,540 A | 11/1975 | Pollitzer | |
| 4,334,113 A * | 6/1982 | Pellegrini et al. ................ | 585/18 |
| 4,613,719 A * | 9/1986 | Kukes et al. ................... | 585/528 |
| 4,780,143 A | 10/1988 | Roe | |
| 4,909,847 A | 3/1990 | Ohi et al. | |
| 5,847,252 A * | 12/1998 | Stine et al. ..................... | 585/330 |
| 6,358,309 B1 | 3/2002 | Langford | |
| 6,733,581 B2 * | 5/2004 | Langford ....................... | 106/661 |
| 6,900,259 B2 * | 5/2005 | Klein et al. .................... | 524/315 |
| 7,045,008 B2 * | 5/2006 | Langford ....................... | 106/504 |
| 7,161,053 B2 * | 1/2007 | Beckmann et al. ............ | 585/530 |
| 2001/0011112 A1 | 8/2001 | Langford | |
| 2001/0023653 A1 | 9/2001 | Langford | |
| 2003/0164478 A1 * | 9/2003 | Fiedler et al. .................. | 252/500 |
| 2011/0179976 A1 * | 7/2011 | Huber et al. ................... | 106/727 |

FOREIGN PATENT DOCUMENTS

| | | |
|---|---|---|
| DE | 1 568 542 | 5/1970 |
| DE | 43 39 713 | 5/1995 |
| DE | 196 42 770 | 4/1998 |
| DE | 199 57 173 | 5/2001 |
| DE | 101 28 242 | 12/2002 |
| DE | 10 2004 018 753 | 11/2005 |
| DE | 20 2006 016 797 | 2/2007 |
| EP | 0 081 041 | 6/1983 |
| EP | 0 403 874 | 12/1990 |
| EP | 0 668 257 | 8/1995 |
| EP | 1 457 475 | 9/2004 |
| GB | 799 396 | 8/1958 |
| GB | 1 155 539 | 6/1969 |
| WO | 99 25668 | 5/1999 |
| WO | 00 34200 | 6/2000 |
| WO | 00 53546 | 9/2000 |
| WO | 00 59849 | 10/2000 |
| WO | 01 72670 | 10/2001 |
| WO | 2006 084588 | 8/2006 |

* cited by examiner

*Primary Examiner* — Ellen McAvoy
(74) *Attorney, Agent, or Firm* — Oblon, Spivak, McClelland, Maier & Neustadt, L.L.P.

(57) ABSTRACT

The present invention relates to the use of isoalkane mixtures for reducing or minimizing the dust emission during the handling of pulverulent construction chemistry products, a process for the preparation of the pulverulent construction chemistry products, and hydraulically setting materials comprising the isoalkane mixtures according to the invention.

20 Claims, No Drawings

USE OF ISOALKANE MIXTURES FOR DEDUSTING CONSTRUCTION CHEMISTRY PRODUCTS

CROSS REFERENCE TO RELATED APPLICATION

This application is a 371 of PCT/EP08/056,710, filed on May 30, 2008, and claims priority to European Patent Application No. 07109344.7, filed on May 31, 2007.

The present invention relates to the use of isoalkane mixtures for reducing or minimizing the dust formation during the handling of pulverulent construction chemistry products, a process for the preparation of the pulverulent construction chemistry products, and hydraulically setting materials comprising the isoalkane mixtures according to the invention.

Hydrocarbon mixtures which comprise short-chain olefins, for example having 2 to 6 carbon atoms, are available on an industrial scale. Thus, a hydrocarbon mixture referred to as a $C_4$ cut and having a high total olefin content is obtained, for example, during the working up of mineral oil by steam cracking or fluidized catalyst cracking (FCC), said mixture being substantially olefins having 4 carbon atoms. Such $C_4$ cuts, i.e. mixtures of isomeric butenes and butanes, are very suitable for the preparation of oligomers, in particular of octenes and dodecenes, if appropriate after prior removal of the isobutene and hydrogenation of the butadiene present.

The substantially linear oligomer mixtures obtainable from olefin mixtures comprising predominantly linear starting olefins have become very important. They are suitable, for example, as a diesel fuel component and as intermediates for the preparation of functionalized, predominantly linear hydrocarbons. Thus, by hydroformylation and subsequent hydrogenation of the olefin oligomers, the corresponding alcohols are obtained, which are used, inter alia, as starting materials for detergents plasticizers. For many fields of use, for example as plasticizer alcohols, the degree of branching of the olefins plays a decisive role. The degree of branching is described, for example, by the ISO index, which indicates the average number of methyl branches of the respective olefin fraction. Thus, for example in the case of a $C_8$ fraction, the n-octenes contribute 0, methylheptenes contribute 1 and dimethylhexenes contribute 2 to the ISO index of the fraction. The lower the ISO index, the greater the linearity of the molecules in the respective fraction.

It is known that catalysts which comprise metals and very predominantly nickel as an active component can be used for the preparation of oligomers which have a low degree of branching and are likewise olefinically unsaturated from lower olefins. Compared with homogeneous catalysts, heterogeneous catalysts have the advantage here that there is no need to separate the catalyst from the reactor discharge. Thus, for example, DE-A 43 39 713 (=WO 95/14647) discloses a process for the oligomerization of straight-chain $C_2$- to $C_6$-olefins over a fixed-bed catalyst at superatmospheric pressure and elevated temperature, the catalyst comprising, as substantial active constituents, from 10 to 70% by weight of nickel oxide, from 5 to 30% by weight of titanium dioxide and/or zirconium dioxide, and from 0 to 20% by weight of alumina, the remainder being silica. Further oligomerization catalysts and oligomerization processes are described, for example, in WO 99/25668, WO 00/59849, WO 00/53546, WO 01/72670 and EP-A 1 457 475.

Dry, in particular pulverulent construction chemistry products, such as hydraulically setting or cement-based materials (e.g. tile cements, joint fillers, filling compounds, slurry seal coatings, etc.), lead to substantial dust formation during transfer and mixing processes. Numerous attempts have therefore been made to reduce or to suppress the development of dust in such products.

For example attempts were made to reduce the development of dust in the case of hydraulically setting materials, for example filling compounds, via the degree of milling and the particle composition of the pulverulent products, but the processability of coarser powders is poor.

A further method for reducing the development of dust is aggregation, for example with water, aqueous solutions or dispersions. Thus, for example, U.S. Pat. No. 4,780,143 discloses the addition of aqueous foam to clinker prior to milling to give cement, in order to reduce the development of dust. Furthermore, additions of plastics dispersions to cement for air-placed concrete compositions have already been proposed for reducing the dust formation. Temporary aggregation in the case of hydraulically setting material is of no importance only when the products are subsequently milled or, for example, are to be used as air-placed concrete or air-placed mortar. However, in finely pulverulent filling compounds, for example, on which floor coverings are to be laid after application, coarser aggregations are not acceptable since they stand out on the surface of many smooth floor covering materials.

In EP 403 874, special ethylene oxide/propylene oxide block copolymers are mentioned as additives for reducing dust. However, a disadvantage of these additives is that large amounts thereof often have to be used for achieving a significant effect.

WO 2006/084588 discloses the use of highly viscous, linear hydrocarbons or hydrocarbon mixtures as additives for reducing the dust of pulverulent construction chemistry products. However, the high viscosity of the hydrocarbons used, which also give rise to a high consumption and hence low efficiency of the additives used, is a disadvantage of the systems described there.

Another frequent disadvantage of these processes is the technically complicated and commercially expensive process for dedusting. In general, the dedusting composition must be sprayed in by means of specially shaped lances in a separate process step in order to ensure the dedusting and at the same time to prevent the formation of lumps.

DE 10 2004 018 753 A1 describes a process for the preparation of a $C_{16}$-alkane mixture, in which a butene-containing $C_4$-hydrocarbon stream is oligomerized in the presence of a nickel-containing catalyst, the $C_{16}$-olefin fraction is then isolated and the isolated $C_{16}$ fraction is hydrogenated. $C_{16}$-Alkane mixtures which have a proportion of $\geq 95\%$ by mass of $C_{16}$-alkanes and the use thereof are furthermore described. General information on the use of such compositions in cosmetics, as solvents or in the metal industry is given. Information on the use of such compositions in construction chemistry or for dedusting is completely absent.

It was therefore the object of the present invention to provide additives for reducing the development of dust, which additives are advantageously suitable as dedusting compositions for pulverulent construction chemistry products and are distinguished by simple application and high efficiency. In addition, this should not lead to the formation of lumps when used and should not lead to reduced strength of the hardened systems.

According to the invention, the object was achieved by the use of additives comprising an isoalkane mixture whose $^1$H-NMR spectrum has an area integral of from 25 to 70%, based on the total integral area, in the range of a chemical shift $\delta$ of from 0.6 to 1.0 ppm, based on tetramethylsilane.

The present invention therefore relates to the use of the isoalkane mixtures according to the invention as additives for reducing or minimizing dust emission during the handling of pulverulent construction chemistry products, having organic and/or mineral constituents, a process for the preparation of the pulverulent construction chemistry products, and pulverulent construction chemistry products comprising the isoalkane mixtures according to the invention.

The pulverulent construction chemistry products comprise organic and/or mineral constituents.

Pulverulent construction chemistry products comprising organic and/or mineral constituents may be, for example, tile cements, slurry seal coatings, reinforcing adhesives, adhesives for composite heat insulation systems, mineral renders, repair mortars, self-leveling filling compounds, stopping compounds, floor topping systems, thick-bed mortar, joint mortar or surface protection systems.

The organic constituents of the construction chemistry products are understood as meaning, for example, redispersible polymer powders, thickeners, stabilizers, antifoams, dispersants, emulsifiers or pigments.

The mineral constituents may be, for example, cement, gypsum, lime, chalk, sand, quartz powder, clay, ash, slag, microsilica, light fillers, such as expanded glass, explanded clay, Poraven®, Expancell®, and pigments.

The invention furthermore relates to the use of the isoalkane mixtures according to the invention as additives for dedusting pulverulent polymers or polymer powders and redispersible polymer powders as shown below:

| Redispersible polymer powders | Polymers | Polymer powder |
|---|---|---|
| VAc/E/Veova | starches | PVC (polyvinyl chloride) |
| S/acrylate | celluloses | phenol resin binders |
| S/B | rubber | Vinurans |
| UF/MF | | Kaurit resins |
| Pure acrylates | | |

VAc = vinyl acetate
S = styrene
B = butadiene
E = ethylene
Veova = vinyl ester of versatic acid
UF = urea/formaldehyde
MF = melamine/formaldehyde Owing to the good spreading effect, the dedusting composition according to the invention can be applied to various substrate materials and then used as dedusting powder in formulations.

Suitable substrate materials are both hydraulic substances (e.g. cement, gypsum, dispersion powder, etc.), fillers (e.g. sand, rock flour, light fillers, lime, etc.) and additives (e.g. non-hydrophobized silica, celluloses). These are firstly themselves dedusted and secondly serve as a substrate material in the case of an overdose of dedusting composition. This combination can then be used as dedusting powder in construction chemistry formulations (cf. page 23 et seq.). The formulator thus requires no additional plant for dedusting his products.

Even small amounts of <0.5% of dedusting composition could make it possible to reduce the explosion classification of the production and processing plants. If appropriate, the plants can thus be substantially more economically equipped (e.g. no explosion-proof motors, explosion-proof measuring apparatus, etc.). The plant safety may thus increase substantially.

The isoalkane mixtures according to the invention have, in a $^1$H-NMR spectrum, an area integral of from 25 to 70%, based on the total integral area, in the range of a chemical shift $\delta$ of from 0.6 to 1.0 ppm, based on tetramethylsilane.

Isoalkane mixtures whose $^1$H-NMR spectrum has an area integral of from 30 to 60%, preferably from 35 to 55%, based on the total integral area, in the range of a chemical shift $\delta$ of from 0.6 to 1.0 ppm are preferred.

The isoalkane mixtures according to the invention preferably have no olefinic double bonds. Suitable isoalkane mixtures have, in the $^1$H-NMR spectrum, only few signals attributable to olefin protons in the region of a chemical shift $\delta$ of from 4 to 6 ppm; the integral of the signal accounts for less than 0.5%, preferably less than 0.2%, of the total integral.

The isoalkane mixture furthermore preferably has, in the $^1$H-NMR spectrum, an area integral of up to 95%, particularly preferably of up to 98%, based on the total integral area, in the range of a chemical shift $\delta$ of from 0.5 to 3 ppm (i.e. in the range of the aliphatic protons).

The isoalkane mixtures according to the invention substantially have no tert-butyl groups ($-C(CH_3)_3$). The proportion of terminal tert-butyl groups is preferably not more than 20%, particularly preferably not more than 10%, in particular not more than 5% and especially not more than 2%.

The isoalkanes according to the invention preferably have a uniform structure. Thus, based on the longest continuous carbon chain, they have substantially or exclusively methyl branches. The proportion of side chains having alkyl groups which have two or more than 2 carbon atoms is less than 20%, preferably not more than 10%, particularly preferably not more than 5%, in particular not more than 1%, based on the total number of branch points.

Preferably, the isoalkane mixtures comprise at least 70% by weight, preferably at least 85% by weight, in particular at least 95% by weight, of alkanes having 8 to 20 carbon atoms.

Preferably, the isoalkane mixtures comprise at least 70% by weight, preferably at least 80% by weight, in particular at least 90% by weight (such as, for example, at least 94% by weight), of alkanes having 12 to 20 carbon atoms.

The alkane mixture according to the invention preferably comprises at least 70% by weight, preferably at least 85% by weight, in particular at least 95% by weight, of alkanes having an even number of carbon atoms. A special embodiment is an isoalkane mixture which substantially comprises alkanes having 8 or 12 or 16 carbon atoms.

The isoalkane mixtures according to the invention preferably have an oligomeric distribution, i.e. a nonuniformity based on the number of carbon atoms (and hence of the molecular weight), of the alkanes present. The isoalkane mixtures according to the invention preferably comprise less than 95% by weight, particularly preferably not more than 90% by weight, based on their total weight, of alkanes of the same molecular weight. Such nonuniform isoalkane mixtures may have particularly advantageous performance characteristics, especially for use in construction chemistry products. These include in particular the rheological properties of the isoalkane mixtures according to the invention, such as the spreading behavior. Thus, the relative spreading values of the isoalkane mixtures according to the invention (based on liquid paraffin as standard) are at least 130%, particularly preferably at least 140%, and especially preferably at least 150%. They therefore surpass the oil bodies usually used in the prior art and in particular isohexadecane ($C_{16}$-isoalkane, and mixtures having a very high $C_{16}$-isoalkane content, for example according to DE 10 2004 018 753). The isoalkane mixtures according to the invention and isoalkane mixtures obtainable by the process according to the invention preferably have a kinematic viscosity, determined at 40° C. according to DIN51562 (measurements using an Ubbelohde viscometer with suspended ball level and ring marks to determine the kinematic viscosity of Newtonian liquids), of from 1 to 9, preferably 2-5, mm²/s. Typical values are about 3 or about 4 mm²/s at 40° C.

The isoalkane mixtures according to the invention and isoalkane mixtures obtainable by the process according to the invention preferably have a density in the range from 0.7 to 0.82 g/cm³, particularly preferably in the range from 0.75 to 0.8 g/cm³.

The isoalkane mixtures according to the invention and isoalkane mixtures obtainable by the process according to the invention preferably a refractive index in the range from 1.4 to 1.5.

The isoalkane mixtures according to the invention preferably have a degree of branching V in the range of from 0.1 to 0.35, particularly preferably from 0.12 to 0.3, in particular from 0.15 to 0.27 and especially from 0.17 to 0.23.

In the context of the present invention, the degree of branching V is defined, independently of molecular weight, as the number of branches per carbon atom (V=number of branches/number of carbon atoms, e.g. n-octane: 0/8=0, methylheptane: 1/8=0.125, dimethylhexane: 2/8=0.25.

Suitable isoalkane mixtures are obtainable by a process in which
a) a hydrocarbon starting material which comprises at least one olefin having 2 to 6 carbon atoms is provided,
b) the hydrocarbon starting material is subjected to an oligomerization over a transition metal-containing catalyst,
c) the oligomerization product obtained in step b) is hydrogenated. In many cases, a hydrogenation of about 95%, 90% or 85% is sufficient.

A special embodiment of the process likewise forms a subject of the invention.

Step a)

Suitable olefin starting materials for step a) are in principle all compounds which comprise 2 to 6 carbon atoms and at least one ethylenically unsaturated double bond.

In step a), an industrially available olefin-containing hydrocarbon mixture is preferably used.

Preferred industrially available olefin mixtures result from the hydrocarbon cleavage in mineral oil processing, for example by catalytic cracking, such as fluid catalytic cracking (FCC), thermal cracking or hydrocracking, with subsequent dehydrogenation. A preferred industrial olefin mixture is the $C_4$ cut. $C_4$ cuts are obtainable, for example, by fluid catalytic cracking or steam cracking of gas oil or by steam cracking of naphtha. Depending on the composition of the $C_4$ cut, a distinction is made between the total $C_4$ cut (crude $C_4$-cut), the so-called raffinate I obtained after removal of 1,3-butadiene, and the raffinate II obtained after the removal of isobutene. A further suitable industrial mixture is the $C_5$ cut obtainable on naphtha cleavage. Olefin-containing hydrocarbon mixtures suitable for use in step a) and having 4 to 6 carbon atoms can furthermore be obtained by catalytic dehydrogenation of suitable industrially available paraffin mixtures. Thus, for example, $C_4$ olefin mixtures can be prepared from liquefied gases (liquefied petroleum gas, LPG) and liquefiable natural gases (liquefied natural gas, LNG). The latter comprise, in addition to the LPG fraction, also relatively large amounts of higher molecular weight hydrocarbons (light naphtha) and are therefore also suitable for the preparation of $C_5$- and $C_6$-olefin mixtures. The preparation of olefin-containing hydrocarbon mixtures which comprise monoolefins having 4 to 6 carbon atoms from LPG or LNG streams is possible by customary processes which are known to the person skilled in the art and, in addition to the dehydrogenation, generally also comprise one or more working-up steps. These include, for example, the removal of at least a part of the saturated hydrocarbons present in the abovementioned olefin starting mixtures. These can, for example, be used again for the preparation of olefin starting materials by cracking and/or dehydrogenation. However, the olefins used in step a) may also contain a proportion of saturated hydrocarbons which are inert to the oligomerization conditions. The proportion of these saturated components is in general not more then 60% by weight, preferably not more than 40% by weight, particularly preferably not more than 20%, based on the total amount of the olefins and saturated hydrocarbons present in the hydrocarbon starting material.

A hydrocarbon mixture which comprises from 20 to 100% by weight of $C_4$ olefins, from 0 to 80% by weight of $C_5$ olefins, from 0 to 60% by weight of $C_6$ olefins and from 0 to 10% by weight of olefins differing from the abovementioned olefins, based in each case on the total olefin content, is preferably provided in step a).

A hydrocarbon mixture which has a content of at least 80% by weight, particularly preferably at least 90% by weight and in particular at least 95% by weight, based on the total olefin content, of linear monoolefins is preferably provided in step a). The linear monoolefins are selected from 1-butene, 2-butene, 1-pentene, 2-pentene, 1-hexene, 2-hexene, 3-hexene and mixtures thereof. For establishing the desired degree of branching of the isoalkane mixture, it may be advantageous if the hydrocarbon mixture used in step a) comprises up to 20% by weight, preferably up to 5% by weight, in particular up to 3% by weight, of branched olefins, based on the total olefin content.

A $C_4$ hydrocarbon mixture is particularly preferably provided in step a).

The butene content, based on 1-butene, 2-butene and isobutene, of the $C_4$ hydrocarbon mixture provided in step a) is preferably from 10 to 100% by weight, particularly preferably from 50 to 99% by weight and in particular 70 to 95% by weight, based on the total olefin content. The ratio of 1-butene to 2-butene is preferably in a range from 20:1 to 1:2, in particular from about 10:1 to 1:1. The $C_4$-hydrocarbon mixture used in step a) preferably comprises less than 5% by weight, in particular less than 3% by weight, of isobutene.

The provision of the olefin-containing hydrocarbons in step a) may comprise removal of branched olefins. Customary separation methods known from the prior art and based on different physical properties of linear and branched olefins or on different reactivities which permit selective reactions are suitable. Thus, for example, isobutene can be separated from $C_4$-olefin mixtures, such as raffinate I, by one of the following methods:

separation using a molecular sieve,
fractional distillation,
reversible hydration to give tert-butanol,
acid-catalyzed alcohol addition reaction with a tertiary ether, e.g. methanol addition reaction to give methyl tert-butyl ether (MTBE),
irreversible catalytic oligomerization to give di- and tri-isobutene,
irreversible polymerization to give polyisobutene.

Such methods are described in K. Weissermel, H.-J. Arpe, Industrielle organische Chemie, 4th edition, pages 76-81, VCH-Verlagsgesellschaft Weinheim, 1994, which is hereby incorporated by reference in its entirety.

Preferably, a raffinate II is provided in step a).

A raffinate II suitable for use in the process according to the invention has, for example, the following composition:

from 0.5 to 5% by weight of isobutane,
from 5 to 20% by weight of n-butane,
from 20 to 40% by weight of trans-2-butene,
from 10 to 20% by weight of cis-2-butene,
from 25 to 55% by weight of 1-butene,
from 0.5 to 5% by weight of isobutene
and trace gases, such as 1,3-butadiene, propene, propane, cyclopropane, propadiene, methylcyclopropane, vinylacetylene, pentenes, pentanes etc., in a range in each case of not more than 1% by weight.

A suitable raffinate II has the following typical composition:

| | |
|---|---|
| isobutane, n-butane | 26% by weight, |
| isobutene | 1% by weight, |
| 1-butene | 26% by weight, |
| trans-2-butene | 31% by weight, |
| cis-2-butene | 16% by weight. |

If diolefins or alkynes are present in the olefin-rich hydrocarbon mixtures, they can be removed therefrom to preferably less than 10 ppm by weight before the oligomerization. They are preferably removed by selective hydrogenation, for example according to EP 81 041 and DE 15 68 542, particularly preferably by a selective hydrogenation to a residual content of less than 5 ppm by weight, in particular 1 ppm by weight.

Oxygen-containing compounds, such as alcohols, aldehydes, ketones or ethers, are also expediently substantially removed from the olefin-rich hydrocarbon mixture. For this purpose, the olefin-rich hydrocarbon mixture can advantageously be passed over an adsorbent, such as, for example, a molecular sieve, in particular one having a pore diameter of >4 Å to 5 Å. The concentration of oxygen-containing, sulfur-containing, nitrogen-containing and halogen-containing compounds in the olefin-rich hydrocarbon mixture is preferably less than 1 ppm by weight, in particular less than 0.5 ppm by weight.

Step b)

In context of the present invention, the term "oligomers" comprises dimers, trimers, tetramers and higher products of the reaction for the synthesis of the olefins used. The oligomers obtained in step b) are preferably selected from dimers, trimers and tetramers. The oligomers in turn are olefinically unsaturated. By a suitable choice of the hydrocarbon starting material used for the oligomerization and of the oligomerization catalyst, as described below, the desired isoalkanes can be obtained.

For the oligomerization in step b), it is possible to use a reaction system which comprises one or more, identical or different reactors. In the simplest case, a single reactor is used for the oligomerization in step b). However, it is also possible to use a plurality of reactors which have identical or different mixing characteristics in each case. The individual reactors can, if desired, be subdivided once or several times by internals. If two or more reactors form the reaction system, they can be connected as desired to one another, for example in parallel or in series. In a suitable embodiment, for example, a reaction system which consists of two reactors connected in series is used.

Suitable pressure-resistant reaction apparatuses for the oligomerization are known to the person skilled in the art. These include the generally customary reactors for gas-solid and gas-liquid reactions such as, for example, tubular reactors, stirred tanks, gas circulation reactors, bubble columns, etc., which, if appropriate, can be subdivided by internals. Tube-bundle reactors or shaft furnaces are preferably used. If a heterogeneous catalyst is used for the oligomerization, it may be arranged in a single fixed catalyst bed or in a plurality of fixed catalyst beds. This makes it possible to use different catalysts in different reaction zones. However, the use of the same catalyst in all reaction zones is preferred.

The temperature during the oligomerization reaction is in general in a range from about 20 to 280° C., preferably from 25 to 200° C., in particular from 30 to 140° C. The pressure during the oligomerization is in general in the range from about 1 to 300 bar, preferably from 5 to 100 bar and in particular from 20 to 70 bar. If the reaction system comprises more than one reactor, said reactor may have the same or different temperatures and the same or different pressures. Thus, for example, a higher temperature and/or a higher pressure may be established in the second reactor of a reactor cascade than in the first reactor, for example to achieve as complete a conversion as possible.

In a special embodiment, the temperature and pressure values used for the oligomerization are chosen so that the olefin-containing starting material is present in liquid form or in the supercritical state.

The reaction in step b) is preferably carried out adiabatically. In the context of the present invention, this term is understood in the technical sense and not in the physico-chemical sense. Thus, the oligomerization reaction takes place as a rule exothermally so that the reaction mixture experiences an increase in temperature while flowing through the reaction system, for example a catalyst bed. An adiabatic reaction is understood as meaning a procedure in which the quantity of heat liberated in an exothermic reaction is absorbed by the reaction mixture in the reactor and no cooling by cooling apparatuses is used. Thus, the heat of reaction is removed from the reactor together with reaction mixture, apart from a residual proportion which is released to the environment by natural heat conduction and heat radiation from the reactor.

For the oligomerization in step b), a transition metal-containing catalyst is used. Heterogeneous catalysts of this type are preferred. Preferred catalysts which are known to produce little oligomer branching are generally known to the person skilled in the art. These include the catalysts described in Catalysis Today, 6, 329 (1990), in particular pages 336-338, and those described in DE-A 43 39 713 (=WO-A 95/14647) and DE-A 199 57 173, which are hereby incorporated by reference. A suitable oligomerization process in which the feed stream used for the oligomerization is divided and is fed to at least two reaction zones operated at different temperatures is described in EP-A 1 457 475, which is likewise hereby incorporated by reference.

The heterogeneous nickel-comprising catalysts used may have different structures. In principle, unsupported catalysts and supported catalysts are suitable. The latter are preferably used. The support materials may be, for example, silica, alumina, aluminosilicates, aluminosilicates having layer structures and zeolites, such as mordenite, faujasite, zeolite X, zeoliteY and ZSM-5, zirconium oxide, which has been treated with acids, or sulfated titanium dioxide. Precipitated catalysts which are obtainable by mixing of aqueous solutions of nickel salts and silicates, e.g. sodium silicate with nickel nitrate, and, if appropriate, aluminum salts, such as aluminum nitrate, and calcination are particularly suitable. Furthermore, catalysts which are obtainable by incorporation of $Ni^{2+}$ ions by ion exchange into natural or synthetic sheet silicates, such as montmorillonites, can be used. Suitable catalysts can also be obtained by impregnation of silica, alumina or aluminosilicates with aqueous solutions of soluble nickel salts, such as nickel nitrate, nickel sulfate or nickel chloride, and subsequent calcination.

Catalysts comprising nickel oxide are preferred. Catalysts which substantially comprise NiO, $SiO_2$, $TiO_2$ and/or $ZrO_2$ and, if appropriate, $Al_2O_3$ are particularly preferred. A catalyst which comprises, as substantial active constituents, from 10 to 70% by weight of nickel oxide, from 5 to 30% by weight of titanium dioxide and/or zirconium dioxide and from 0 to 20% by weight of alumina, the remainder being silica, is most preferred. Such a catalyst is obtainable by precipitation of the catalyst material at pH 5 to 9 by addition of an aqueous solution comprising nickel nitrate to an alkali waterglass solution which comprises titanium dioxide and/or zirconium dioxide, filtration, drying, and annealing at from 350 to 650° C. Regarding the preparation of these catalysts, reference is made in particular to DE-A 43 39 713. The disclosure of this publication and the prior art cited therein after are hereby incorporated by reference.

In a further embodiment, a nickel catalyst according to DE-A 199 57 173 is used as a catalyst in step b). This is substantially alumina which was treated with a nickel compound and a sulfur compound. A molar ratio of sulfur to nickel in the range from 0.25:1 to 0.38:1 is preferably present in the finished catalyst.

The catalyst is preferably present in the form of pieces, for example in the form of tablets, e.g. having a diameter of from 2 to 6 mm and a height of from 3 to 5 mm, rings having, for example, an external diameter of from 5 to 7 mm, a height of from 2 to 5 mm and a hole diameter of from 2 to 3 mm, or extrudates of different lengths having a diameter of, for example, from 1.5 to 5 mm. Such forms are obtained in a manner known per se by tableting or extrusion, generally with the use of a tableting assistant, such as graphite or stearic acid.

Step c)

In step c), as a rule all catalysts of the prior art which catalyze the hydrogenation of olefins to the corresponding alkanes can be used as hydrogenation catalysts. The catalysts can be used both in the heterogeneous phase and as homogeneous catalysts. The hydrogenation catalysts preferably comprise at least one metal of group VIII.

Particularly suitable metals of group VIII are selected from ruthenium, cobalt, rhodium, nickel, palladium and platinum.

The metals can also be used as mixtures. In addition, the catalysts may comprise, in addition to the metals of group VIII, also further metals, for example metals of group VIIa, in particular rhenium, or metals of group Ib, i.e. copper, silver or gold. Particularly preferred metals of group VIII are ruthenium, nickel, palladium and platinum, in particular platinum, nickel and palladium, and more preferably palladium and nickel. Specifically, the catalyst comprises palladium as catalytically active species.

If a heterogeneous catalyst is used, this is suitably present in finely divided form. The finely divided form is achieved, for example, as follows:

Black catalyst: the metal is reductively deposited from the solution of one of its salts shortly before the use as a catalyst.

Adams catalyst: the metal oxides, in particular the oxides of platinum and palladium, are reduced by the hydrogen used for the hydrogenation.

Skeletal or Raney catalyst: the catalyst is prepared as a "metal sponge" from a binary solution of the metal (in particular nickel or cobalt) with aluminum or silicon by dissolving out a partner with acid or alkali. Residues of the original alloy partner often have a synergistic effect.

Supported catalyst: black catalysts can also be deposited on the surface of a support substance. Suitable supports and support materials are described below.

Such heterogeneous catalysts are described in general form, for example in Organikum, 17th edition, VEB Deutscher Verlag der Wissenschaften, Berlin, 1988, page 288. In addition, heterogeneous hydrogenation catalysts which are suitable for the reduction of olefins to alkanes are described in more detail in the following documents:

U.S. Pat. No. 3,597,489, U.S. Pat. No. 2,898,387 and GB 799,396 describe the hydrogenation of benzene to cyclohexane over nickel and platinum catalysts in the gas or liquid phase. GB 1,155,539 describes the use of a rhenium-doped nickel catalyst for the hydrogenation of benzene. U.S. Pat. No. 3,202,723 describes the hydrogenation of benzene with Raney nickel. Ruthenium-containing suspension catalysts which are doped with palladium, platinum or rhodium are used in SU 319582 for the hydrogenation of benzene to cyclcohexane. Alumina-supported catalysts are described in U.S. Pat. No. 3,917,540 and U.S. Pat. No. 3,244,644. The hydrogenation catalysts described in these documents are hereby incorporated by reference in their entirety.

Depending on the design of the hydrogenation process, the support material may have different forms. If the hydrogenation is carried out by the liquid-phase procedure, the support is as a rule used in the form of a finely divided powder. If, on the other hand, the catalyst is used in the form of a fixed-bed catalyst, for example, moldings are used as support material. Such moldings may be in the form of spheres, tablets, cylinders, hollow cylinders, Raschig rings, strands, saddle bodies, stars, spirals, etc. having the size (longest dimension) of from about 1 to 30 mm. In addition, the supports may be present in the form of monoliths, as described, for example, in DE-A-19642770. Furthermore, the supports may be used in the form of wires, metal sheets, grids, nets, woven fabrics and the like.

The supports may consist of metallic or nonmetallic, porous or nonporous material.

Suitable metallic materials are, for example, highly alloyed stainless steels. Suitable nonmetallic materials are, for example, mineral materials, e.g. natural and synthetic minerals, glasses or ceramics, plastics, e.g. synthetic or natural polymers, or a combination of the two.

Preferred support materials are carbon, in particular active carbon, silica, in particular amorphous silica, alumina, and also the sulfates and carbonates of the alkaline earth metals, calcium carbonate, calcium sulfate, magnesium carbonate, magnesium sulfate, barium carbonate and barium sulfate.

The catalyst can be applied to the support by customary methods, for example by impregnation, wetting or spraying of the support with a solution which comprises the catalyst or a suitable precursor thereof.

Suitable supports and methods for applying the catalyst to them are described, for example in DE-A 101 28 242, which is hereby incorporated by reference in its entirety.

Homogeneous hydrogenation catalysts can also be used in the process according to the invention. Examples of these are the nickel catalysts which are described in EP-A 0 668 257. A disadvantage of the use of homogeneous catalysts, however, is their production costs and also the fact that as a rule they cannot be regenerated.

In the process according to the invention, heterogeneous hydrogenation catalysts are therefore preferably used.

Particularly preferably, the heterogeneous catalysts used in the process according to the invention comprise at least one metal of subgroup VIII, which is selected from ruthenium, nickel, cobalt, palladium and platinum, and, if appropriate, a further transition metal, in particular of subgroup VIIa, Ib or IId and in particular copper.

Particularly preferably, the metal is used in supported form or as a metal sponge. Examples of supported catalysts are in particular palladium, nickel or ruthenium on carbon, in particular active carbon, silica, in particular on amorphous silica, barium carbonate, calcium carbonate, magnesium carbonate or alumina, it being possible for the supports to be present in the forms described above. Preferred support forms are the moldings described above.

The metallic catalysts can also be used in the form of their oxides, in particular palladium oxide, platinum oxide or nickel oxide, which are then reduced under hydrogenating conditions to give the corresponding metals.

In particular, Raney nickel is used in the form of a metal sponge.

Nickel and copper on support materials, such as silica, are especially used as a hydrogenation catalyst in the process according to the invention.

The hydrogenation catalyst is preferably arranged in a fixed bed.

The hydrogenation is effected at a temperature of, preferably, from 20 to 250° C., particularly preferably from 50 to 240° C. and in particular from 120 to 180° C.

The reaction pressure of the hydrogenation is preferably in the range from 1 to 300 bar, particularly preferably from 10 to 150 bar and in particular from 20 to 70 bar.

Both reaction pressure and reaction temperature depend, inter alia, on the activity and amount of the hydrogenation catalyst used and can be determined in the specific case by the person skilled in the art.

The hydrogenation can be carried out in a suitable solvent or preferably in the absence of a solvent. Suitable solvents are those which are inert under the reaction conditions, i.e. neither react with the starting material or product nor are changed themselves, and which can be separated without problems from the isoalkanes obtained. The suitable solvents include open-chain and cyclic ethers, such as diethyl ether, methyl tert-butyl ether, tetrahydrofuran or 1,4-dioxane, and alcohols, in particular $C_1$-$C_3$-alkanols, such as methanol, ethanol, n-propanol or isopropanol. Mixtures of the abovementioned solvents are also suitable.

The hydrogen required for the hydrogenation can be used both in pure form and in the form of hydrogen-containing gas mixtures. However, the latter must not comprise any harmful amounts of catalyst poisons, such as CO. Examples of suitable hydrogen-containing gas mixtures are those from the reforming process. However, hydrogen in pure form is preferably used.

The hydrogenation is preferably carried out continuously.

The removal of the solvent is effected by customary methods, for example by distillation, in particular under reduced pressure.

In a special embodiment of the process according to the invention, the oligomerization product obtained in step b) and/or the hydrogenation product obtained in step c) is subjected to a separation. At least one fraction enriched in a certain oligomer or hydrogenated oligomer is obtained. Thus, for example, a $C_4$ hydrocarbon mixtures is subjected in step b) to an oligomerization and then, before the hydrogenation, subjected to a separation, at least one fraction enriched in $C_8$-, $C_{12}$- or $C_{16}$-oligomers being obtained. This or these oligomer-enriched fraction or fraction(s) is or are then used for the hydrogenation. Similarly, an oligomer mixture from step b) is first hydrogenated without separation and the product mixture of the hydrogenation is then subjected to a separation, at least one fraction enriched in $C_8$-, $C_{12}$- or $C_{16}$-isoalkanes being obtained, for example, with the use of a $C_4$ hydrocarbon mixture for the oligomerization. In a preferred embodiment, as mentioned at the outset, the fractions enriched in one of the abovementioned alkanes comprise further alkanes differing therefrom. These are preferably substantially alkanes having a higher molecular weight than the enriched alkane. For example, a fraction enriched in $C_{16}$-isoalkanes, which comprises substantially no $C_8$- and/or $C_{12}$-isoalkanes but which comprises $C_{20}$-isoalkanes and, if appropriate, higher homologs, is then preferably obtained.

In the separation, the reaction mixture of the oligomerization or the hydrogenation can be subjected to one or more separation steps. Suitable separation apparatuses are the customary apparatuses known to the person skilled in the art. These include, for example, distillation columns, e.g. tray columns, which, if desired, may be equipped with bubble caps, sieve plates, sieve trays, valves, side take-offs, etc. Evaporators, such as thin-film evaporators, falling-film evaporators, wiped-surface evaporators, Sambay evaporators, etc., and combinations thereof. The isolation of the olefin fraction is preferably effected by one-stage or multistage fractional distillation.

The isoalkane mixtures according to the invention are particularly advantageously suitable for use in pulverulent construction chemistry products. They are generally odorless and in particular have no odorous components felt to be "foreign" or "chemical" by the processor, for example an olefin-like odor.

Furthermore, the isoalkane mixtures according to the invention are as a rule colorless or have only a slight natural color. Preferably, the isoalkane mixtures according to the invention and isoalkane mixtures obtainable by the process according to the invention have a Hazen or APHA color number (determined according to DIN 6271) of not more than 6, particularly preferably of not more than 5. Depending on the molecular weight, the isoalkanes are of fluid to oily consistency. Isoalkane mixtures which comprise isoalkanes having 8 to 28, preferably 8 to 20, carbon atoms are preferably used in pulverulent construction chemistry products. These isoalkane mixtures are liquid under standard conditions (25° C., 1013 mbar).

In a special embodiment, isoalkane mixtures which have a high uniformity with respect to the molecular weight of the isoalkanes present are used in pulverulent construction chemistry products. These are preferably dimers, trimers or tetramers. These isoalkane mixtures then preferably comprise at least 70% by weight, particularly preferably at least 85% by weight and in particular at least 95% of isoalkanes having the same number of carbon atoms.

Compared with the oily substances known from the prior art, for dedusting of pulverulent construction chemistry products, the isoalkanes according to the invention are distinguished by comparable or better performance characteristics. Thus, they have excellent skin tolerance, do not lead to irritation, do not form lumps when mixed in and are rapidly distributed over the surface of the ingredients of pulverulent construction chemistry products. Their flash points are sufficiently high to satisfy stringent safety standards in the preparation and use. Thus, for example, a $C_{16}$-isoalkane mixture according to the invention has as a rule a flash point of at least 100° C., such as, for example, of 105° C.

Furthermore, the additives according to the invention are distinguished by low viscosity and high effectiveness ("spreading effect"), which enables the users to achieve good dedusting effects with the use of very small amounts (from 0.25 to 0.5%).

As a result of the existing "spreading effect" and the low viscosity, no formation of lumps takes place in the dedusting product during the metering in of the dedusting composition. It is therefore possible for the person formulating the above products to meter the dedusting composition directly into his existing mixing process without particular spraying means.

Redispersed polymer powder dedusted with the isoalkane mixtures according to the invention can even serve as a carrier for dedusting further formulation components (e.g. cement). Thus, for example, 35 g of Portland cement (CEMI 42.5) can be dedusted on addition of 2% of dedusting composition to 5 g of polymer powder. It is sufficient here if the "impregnated" polymer powder is simply mixed with the cement.

In addition to the isoalkane mixtures according to the invention and isoalkane mixtures obtainable by the process according to the invention, isoalkane mixtures which have a very high proportion of alkanes of the same molecular weight are also suitable for the dedusting of pulverulent construction chemistry products. These include isoalkane mixtures which comprise greater then or equal to 95% by weight, preferably at least 96% by weight, in particular at least 97% by weight, of alkanes of same molecular weight. These are preferably $C_{16}$-isoalkane mixtures (referred to below as "isoalkane mixtures having a high $C_{16}$ content").

The invention therefore furthermore relates to a dedusting composition for pulverulent construction chemistry products which comprises at least one mixture comprising $C_{16}$-alkanes, the mixture having the proportion of greater than or equal to 95% by weight of $C_{16}$-alkanes. The dedusting composition for pulverulent construction chemistry products then preparably comprises a mixture comprising $C_{16}$-alkanes, wherein the mixture has a composition in which the molecules present comprise on average less than 1.0 quaternary carbon atoms per molecule, the mixture having a proportion of greater than or equal to 95% by mass of $C_{16}$-alkanes and the mixture having a proportion of less than 5% by mass of n-hexadecane.

Such mixtures comprising $C_{16}$-isoalkanes are obtainable by a process in which a) a butene-containing $C_4$-hydrocarbon stream which comprises less than 5% by mass, based on the sum of all butenes, of isobutene is oligomerized in the presence of a nickel-containing catalyst, b) a $C_{16}$-olefin fraction is separated off from the reaction mixture and c) the $C_{16}$-fraction is hydrogenated.

Suitable $C_{16}$-isoalkane mixtures and a process for their preparation are described in DE 10 2004 018 753 A1, which is hereby incorporated by reference in its entirety. In DE 10 2004 018 753 A1 the hydrocarbon mixtures are referred to as $C_{16}$-"alkane" mixtures although they too have only a very small proportion of n-hexadecane. In the context of the present application, the synonymous "iso"alkane mixture is used in order to designate alkane mixtures which comprise branched alkanes.

However, the use of the isoalkane mixtures according to the invention and isoalkane mixtures obtainable by the process according to the invention, which, as mentioned above, have particularly advantageous properties, is particularly preferred. In particular, with regard to the rheological properties and especially in the case of the spreading behavior, they surpass all oily substances known from the prior art, including those of DE 10 2004 018 753 A1, which otherwise have good performance characteristics.

The invention furthermore relates to pulverulent construction chemistry products having reduced dust formation behavior, comprising at least one isoalkane mixture, further customary ingredients or constituents, such as, for example, hardening accelerators, sulfate carriers, antifoams, etc.

The isoalkane mixtures according to the invention and isoalkane mixtures obtainable by the process according to the invention are free of natural odors and have an extremely wide liquid range (at least from −70 to +200° C.).

The amount of the isoalkane mixtures used as dedusting additives is from 0.01 to 10% by weight, preferably from 0.1 to 3% by weight, particularly preferably from 0.2 to 1% by weight, based on the construction chemistry products to be dedusted.

The invention furthermore relates to a process for the preparation of pulverulent construction chemistry products having a reduced dust formation behavior, comprising the isoalkane mixtures according to the invention.

The isoalkane mixture according to the invention is brought into contact or treated with the construction chemistry product. In general, this is effected by spraying the dedusting additives onto the construction chemistry products with a dedusting additive as defined above. The treatment or the bringing into contact of the dedusting additives used according to the invention with the construction chemistry products to be dedusted can, however, also be effected in any other suitable manner which is familiar to the person skilled in the art, for example mixing the construction chemistry products to be dedusted with the liquid dedusting additives, etc. However, spray application of the liquid dedusting additives is preferred according to the invention because this is the simplest and most economical variant for the treatment of the products to be dedusted.

Individual components to which dedusting compositions are added may even serve as carriers for the dedusting of further formulation components (e.g. cement). For example, 35 g of Portland cement (CEM I 42.5) can be dedusted on addition of 2.2% of dedusting composition to 5 g of polymer powder (Acronal® S695P, BASF). Here, it is sufficient if the "impregnated" polymer powder is simply mixed with the cement.

Thus, it is possible for the industrial user to use previously dedusted components by simple admixing in his plant and thus to dedust the entire dry mixture. Complicated process changes are thus dispensed with.

Owing to the low viscosity and good distribution of the product, simple metering of the dedusting composition in the process is also possible.

As described above, when they are used as dedusting additives for dry, pulverulent construction chemistry products, the isoalkane mixtures used according to the invention lead to a substantial minimization of the release of dust in the case of these products.

This effect can be even further increased if the additives according to the invention are used in combination with further suitable additives known from the prior art, for example fibers, such as polyethylene or polypropylene fibers, which achieve a dedusting effect.

The invention is explained in more detail with reference to the following, nonlimiting examples.

EXAMPLES

I. Preparation Examples

Example 1

Preparation of an Isoalkene Mixture

An oligomer according to Example 3 from WO 95/14647 was prepared starting from the $C_4$-hydrocarbon mixture described therein, with the use of the catalyst described in Example 1 from WO 95/14647. 2 kg of this oligomer were subjected to a fractionation over an 80 cm packed column (wire mesh coils) with a reflux ratio of 1:5. The following were obtained:

| Fraction | Boiling range [° C.] | Pressure [mbar] | Amount [g] | Designation |
|---|---|---|---|---|
| 1a | 100-130 | 950 | 1450 | butene dimer |
| 1b | 100-120 | 100 | 350 | butene trimer |
| 1c | bottom product | — | 180 | butene tetramer |

According to the GC analysis, fraction 1c consisted of 7% of $C_{12}$-oligomerization product, 70% of $C_{16}$-oligomerization product, 17% of $C_{20}$-oligomerization product and higher homologs.

Example 2

Hydrogenation of Fraction 1c 6 l of a butene tetramer 1c from Example 1 and 50 g of Pd/active carbon (10% of Pd) were introduced into a 9 l stirred pressure container. Hydrogen was first forced in to a maximum of 50 bar (5 MPa) so that the temperature did not exceed 50° C. Thereafter, the hydrogen pressure was increased to 200 bar (20 MPa) at 50° C. and hydrogenation was continued for 2 hours. After the end of the hydrogenation, the catalyst was separated off first via a fluted filter and then over a short column with $Al_2O_3$. 4.4 kg of a clear, pale, odorless liquid were obtained.

$^1$H-NMR (16 scans, 400 MHz, 10% in $CDCl_3$): no signals detectable in the range of δ 7.0-2.5 ppm; 48% of the integral in the range of δ 0.6-1 ppm.

Example 3

Hydrogenation of Fraction 1a 2 l of a butene dimer 1a from Example 1 and 20 g of Pd/active carbon (10% of Pd) were introduced into a 3.5 l stirred pressure container. Hydrogen was first forced in to a maximum of 20 bar (2 MPa) so that the temperature did not exceed 50° C. Thereafter, the hydrogen pressure was increased to 200 bar (20 MPa) at 50° C. and hydrogenation was continued for 2 hours. After the end of the hydrogenation, the catalyst was separated off first via a fluted filter and then over a short column with $Al_2O_3$. 1.2 kg of a clear, pale, odorless liquid were obtained.

$^1$H-NMR (16 scans, 400 MHz, 10% in $CDCl_3$): no signals detectable in the range of δ 7.0-2.5 ppm; 53% of the integral in the range of δ 0.6-1 ppm.

Example 4

Hydrogenation of Fraction 1b 2 l of a butene trimer 1b from Example 1 and 20 g of Pd/active carbon (10% of Pd) were introduced into a 3.5 l stirred pressure container. Hydrogen was first forced in to a maximum of 20 bar (2 MPa) so that the temperature did not exceed 50° C. Thereafter, the hydrogen pressure was increased to 200 bar (20 MPa) at 50° C. and hydrogenation was continued for 2 hours. After the end of the hydrogenation, the catalyst was separated off first via a fluted filter and then over a short column with $Al_2O_3$. 1.2 kg of a clear, pale, odorless liquid were obtained.

$^1$H-NMR (16 scans, 400 MHz, 10% in $CDCl_3$): no signals detectable in the range of δ 7.0-2.5 ppm; 51% of the integral in the range of δ 0.6-1 ppm.

Table 1 shows the degree of branching V (=number of branches/carbon atoms) and the integral in the range of δ 0.6-1 ppm of the isoalkane mixtures from Examples 2, 3, 4 and 5.

TABLE 1

| Example | Isoalkane mixture | Integral 0.6-1 ppm | Branches/C |
|---|---|---|---|
| 2 | hydrogenated butene tetramer | 48% | 0.21 |
| 3 | hydrogenated butene dimer | 53% | 0.15 |
| 4 | hydrogenated butene trimer | 51% | 0.2 |

II. Spreading Behavior

The spreading values stated below were determined by the following method: a piece of filter paper (filter paper type 1243/90, white, 500×500 mm sheet, manufacturer: Pörringer, about 200×200 mm) is placed freely suspended on a watchglass or a Petri dish, and 10 μl of the lipid to be measured are added in the middle. After 10 minutes, the lipid-wet area is marked, cut out and weighed. The same method is carried out with the internal standard (liquid paraffin). From the values determined, the relative spreading value is calculated according to the following formula:

relative spreading value=(area of measured substance×100)/area of liquid paraffin

TABLE 2

| Oil (trade names) | Relative spreading value [%] | INCI/chemical name/ manufacturer |
|---|---|---|
| Abil ® 350 | 55 | Dimethicone |
| Panalane ® L14E | 82 | Hydrogenated polyisobutene |
| Polysynlan ® | 97 | Hydrogenated polyisobutene |
| DC ® 245 fluid | 109 | Cyclopentasiloxane |
| Finsolv ® TN | 109 | $C_{12-15}$ Alkylbenzoate |
| Fitoderm ® | 111 | Squalane |
| IPP | 111 | Isopropylpalmitate |
| IPM | 113 | Isopropylmyristate |
| Cetiol ® CC | 113 | Dicaprylyl carbonate |
| Creasil ® ISO 20 | 122 | Hydrogenated polyisobutene |
| Sophim ® MC30 | 127 | Hydrogenated polyisobutene |
| Permethyl ® 101A | 134 | Isohexadecane |
| Isohexadecane | 152 | Isohexadecane |
| Isoalkane mixture according to the invention from Example 2 | 156 | |

III. Use Examples a) Cement-Containing Tile Adhesives 1

| Parts by weight | |
|---|---|
| 350.0 | CEM I 42.5 R Milke ® |
| 402.0 | quartz sand F 34 (0.063-0.4 mm) |

-continued

| Parts by weight | |
|---|---|
| 144.0 | quartz sand F 36 (<0.063-0.355 mm) |
| 40.0 | Omyacarb ® 40 |
| 4.0 | Walocel ® MW 40 000 PFV |
| 10.0 | calcium formate |
| 50.0 | Acronal ® S 695 P |
| 1000.0 | total | b) Cement-Containing Tile Adhesive 2

| Parts by weight | |
|---|---|
| 417.0 | CEM I 32.5 R |
| 152.0 | quartz sand F 34 (0.063-0.4 mm) |
| 386.0 | Millisil ® W 4 |
| 25.0 | Microsilica ® 940 UH |
| 4.0 | Walocel ® MT 20 000 PV |
| 1.0 | Luviskol ® K 30 |
| 15.0 | Acronal ® S 629 P |
| 1000.0 | total | c) Repair Mortar

| Parts by weight | |
|---|---|
| 218.0 | quartz sand 0.063-0.4 mm |
| 170.0 | quartz sand 0.15-0.6 mm |
| 218.0 | quartz sand 0.5-1.25 mm |
| 116.0 | quartz sand 1.5-3.0 mm |
| 15.5 | Microsilica ® 940 UH |
| 219.0 | cement CEM I 42.5 R |
| 10.0 | Lumiten ® EP 3108 |
| 0.9 | Tamaol ® NH 7519 |
| 3.6 | Dralon ® fibers white, half-matt, dtex 6.7-4 mm |
| 29 | Acronal ® S 695 P |
| 1000.0 | total | d) Adhesive for Composite Heat Insulation Systems/Reinforcing Mortar

| Parts by weight | |
|---|---|
| 370.0 | Omyacarb ® 130 |
| 140.0 | quartz sand 0.15-0.6 mm |
| 430.0 | cement CEM I 32.5 R |
| 18.0 | Microsilica ® 940 UH |
| 2.0 | Walocel ® MT 20 000 PV |
| 10.0 | Lumiten ® EP 3108 |
| 30.0 | Acronal ® S 695 P |
| 1000.0 | total | e) 1-Component Slurry Seal Coating

| Parts by weight | Dry component |
|---|---|
| 104 | Quarzsand ® (=<0.09 mm) |
| 310 | Quarzsand ® F 36 |
| 325 | cement CEM I 52.5 R |
| 10 | calcium formate |
| 5 | Agitan ® P 803 |
| 46 | Acronal ® S 430 P |
| 1000 | total |

Mixing ratio: dry component/water=about 100:25 f) 2-Component Slurry Seal Coating

| Parts by weight | Wet components |
|---|---|
| 185 | Acronal ® S 456 |
| 115 | water |
| 2 | Agitan ® 282 |
|  | Dry components |
| 143 | Quarzmehl ® (=<0.09 mm) |
| 157 | Quarzsand ® (0.08-0.2 mm) |
| 210 | Quarzsand ® (0.2-0.5 mm) |
| 175 | cement CEM I 42.5 R |
| 13 | Lumiten ® E-P 3108 |
| 1000 | total |

Dry and wet components are thoroughly mixed in the specified ratios.

g) Self-Leveling Filling Compounds

| Parts by weight | |
|---|---|
| 320.0 | cement CEM I 32.5 R Marker ® |
| 100.0 | alumina cement |
| 320.0 | quartz sand 0.063-0.4 mm |
| 200.0 | Omyacarb ® 5 |
| 10.0 | Lumiten ® EP 3108 |
| 2.0 | caseine |
| 11.7 | slaked lime |
| 3.0 | sodium carbonate |
| 2.0 | tartaric acid |
| 0.3 | lithium carbonate |
| 1.0 | Tylose ® H 300 P |
| 30 | Acronal ® S 631 P |
| 1000 | total | h) Stopping Compound

| Parts by weight | |
|---|---|
| 130.0 | quartz sand 0.15-0.6 mm |
| 376.0 | Millisil ® W4 |
| 0.5 | Walocel ® MT 20 000 PV |
| 18.0 | Microsilica ® 940 UH | i) Mineral Render

| Parts by weight | |
|---|---|
| 10.0 | Lumiten ® EP 3108 |
| 417.0 | cement CEM I 32.5 R |
| 48.5 | Acronal ® S 695 P |
| 1000.0 | total | i) Mineral Render

| Parts by weight | |
|---|---|
| 91.0 | Omyacarb ® 5 |
| 189.0 | Omyacarb ® 40 |
| 82.0 | Omyacarb ® 130 |
| 83.0 | Plastorit ® 1 |
| 311.0 | Carolith ® 1000 |
| 31.0 | titanium dioxide rutile, e.g. Kronos ® 2056 |
| 2.0 | Culminal ® MHPC 20 000 P |
| 181.0 | white cement CEM I 42.5 |
| 30.0 | Acronal ® S 695 P |
| 1000.0 | total | j) Industrial Floor Topping

| Parts by weight | |
|---|---|
| 500.0 | Korodur ® hard aggregate 0/4 mm |
| 15.0 | quartz sand 0.063-0.4 mm |
| 110.0 | quartz sand 0.15-0.6 mm |
| 95.0 | quartz sand 0.5-1.25 mm |
| 85.0 | EFA-Füller ® (electrofilter ash) |
| 160.0 | cement CEM I 42.5 R |
| 10.0 | Lumiten ® EP 3108 |
| 25.0 | Acronal ® S 631 P |
| 1000.0 | total |

Re. Tile Cement 1 Formulation:

| Product designation | Function | Manufacturer |
|---|---|---|
| Acronal ® | binder | BASF AG, 67056 Ludwigshafen |
| Walocel | thickener | Wolff Cellulosics, 29656 Walsrode |
| Omyacarb | filler | Omya GmbH, 50968 Köln |
| Calcium formate | accelerator | Fluka Chemie GmbH, CH-9471 Buchs |
| Milke ® cement | hydraulic binder | Milke ® cement, 59590 Geseke |

Tile Cement 2 Formulation:

| Product designation | Function | Manufacturer |
|---|---|---|
| Acronal ® | binder | BASF AG, 67056 Ludwigshafen |
| Luviskol ® | processing assistant | BASF AG, 67056 Ludwigshafen |
| Millisil ® | filler | Quarzwerke GmbH, 50226 Frechen |
| Walocel ® | thickener | Wolff Cellulosics, 29656 Walsrode |
| Microsilica ® | processing assistant | Woermann Bauchemie GmbH, 64293 Darmstadt |

Repair Mortar:

| Product designation | Function | Manufacturer |
|---|---|---|
| Acronal ® | binder | BASF AG, 67056 Ludwigshafen |
| Lumiten ® | antifoam | BASF AG, 67056 Ludwigshafen |
| Tamol ® | water saving | BASF AG, 67056 Ludwigshafen |
| Dralon ® fiber | reinforcement | Schwarzwälder Textilwerke, 77773 Schenkenzell |
| Microsilica ® | processing assistant | Woermann Bauchemie GmbH, 64293 Darmstadt |

Adhesive for Composite Heat Insulation Systems:

| Product designation | Function | Manufacturer |
|---|---|---|
| Acronal ® | binder | BASF AG, 67056 Ludwigshafen |
| Lumiten ® | antifoam | BASF AG, 67056 Ludwigshafen |
| Microsilica ® | processing assistant | Woermann Bauchemie GmbH, 64293 Darmstadt |
| Omyacarb ® | filler | Omya GmbH, 50968 Köln |
| Walocel ® | processing assistant | Wolff Cellulosics, 29656 Walsrode |

1-Component Slurry Seal Coating:

| Product designation | Function | Manufacturer |
|---|---|---|
| Acronal ® S 430 P | binder | BASF AG, 67056 Ludwigshafen |
| Agitan ® P 803 | antifoam | Münzing Chemie GmbH, 74017 Heilbronn |
| Quartz sand F 36 | filler | Quarzwerke GmbH, 50226 Frechen |

2-Component Slurry Seal Coating:

| Product designation | Function | Manufacturer |
|---|---|---|
| Acronal ® S 456 | binder | BASF AG, 67056 Ludwigshafen |
| Lumiten ® E-P 3108 | antifoam | BASF AG, 67056 Ludwigshafen |
| Agitan ® 282 | antifoam | Münzing Chemie GmbH, 74017 Heilbronn |
| Quartz powder/sand | filler | Quarzwerke GmbH, 50226 Frechen |

Self-Leveling Filling Compound:

| Product designation | Function | Manufacturer |
|---|---|---|
| Acronal ® | binder | BASF AG, 67056 Ludwigshafen |
| Lumiten ® | antifoam | BASF AG, 67056 Ludwigshafen |
| Omyacarb ® | filler | Omya GmbH, 50944 Köln |
| Märker ® cement | binder | Märker Zementwerke, 86655 Harburg |
| Alumina cement | binder | Larfarge Tonerdezement GmbH, 47059 Duisburg |

-continued

| Product designation | Function | Manufacturer |
|---|---|---|
| Tylose ® | processing assistant | Clariant GmbH, 65174 Wiesbaden |

Stopping Compound:

| Product designation | Function | Manufacturer |
|---|---|---|
| Acronal ® | binder | BASF AG, 67056 Ludwigshafen |
| Lumiten ® | antifoam | BASF AG, 67056 Ludwigshafen |
| Microsilica ® | processing assistant | Woermann Bauchemie GmbH, 64293 Darmstadt |
| Millisil ® | aggregate | Quarzwerke GmbH, 50226 Frechen |
| Walocel ® | processing assistant | Wolff Cellulosics, 29656 Walsrode |

Mineral Render:

| Product designation | Function | Manufacturer |
|---|---|---|
| Acronal ® | binder | BASF AG, 67056 Ludwigshafen |
| Culminal ® | thickener | Herkules GmbH, 40599 Düsseldorf |
| Omyacarb ®, Carolith ® | filler | Omya GmbH, 50968 Köln |
| Plastorit ® | filler | Vogel & Prenner Nachf., 65185 Wiesbaden |
| Titanium dioxide | pigment | Kronos Titan GmbH, 51307 Leverkusen |

Industrial Floor Topping:

| Product designation | Function | Manufacturer |
|---|---|---|
| Acronal ® | binder | BASF AG, 67056 Ludwigshafen |
| Lumiten ® | antifoam | BASF AG, 67056 Ludwigshafen |
| Korodur ® | aggregate | Korodur Westphal Hartbeton GmbH & Co, 92224 Amberg |
| EFA-Füller ® | filler | BauMineral GmbH, 45699 Herten |

Dedusting of Guide Formulations

1.) Testing of the Efficiency of the Dedusting Composition 200 g of the example formulation (a) for tile adhesives were prepared as a dry blend and the dedusting composition according to Example 2 was then introduced into the dry blend with the aid of an atomizer bottle in order to determine the minimum requirement for dedusting composition.

The mixture was mixed manually and assessed. The results show that a proportion by weight of about 0.25% of dedusting composition is sufficient in this formulation.

2) Testing of the Shelf-Life

About 100 g of the above mixture were introduced into a PE bag and the latter was closed. The bag was then loaded with a commercially available 30×30 cm concrete slab (10 kg weight) under standard conditions. Even after 4 weeks, the mixture exhibits no compacting phenomena.

The reason for the high effectiveness of the dedusting composition in comparison with commercially available dedusting compositions, such as liquid paraffins, is likely to be the "spreading effect" of the composition. This ensures a very rapid and effective distribution of the dedusting composition in the mixture. This effect even ensures "jumping" of the dedusting properties from a dedusted component to the entire formulation.

Dedusting of Commercial Products.

The observed high effectiveness of the dedusted composition was tested on various commercial products. For this purpose, a sample (200 g) of the commercial packaging was removed and the dedusting powder according to Example 2 was added:

| Type | Requirement for dedusting composition |
|---|---|
| Tile cement Ardex ® X77 | 0.25% |
| Cement-lime render Quick-Mix ® finishing coat K13 | 0.8% |
| Filling compound Schomburg ® ASO NM15 | 0.5% |

Dedusting of Individual Components:

The dedusting composition according to Example 2 was added to a sample (200 g) and the requirement for sufficient dedusting was measured:

| Component | Requirement of dedusting composition |
|---|---|
| Cement CEM ® I 32.5 (Heidelberg cement) | 0.7% |
| Redispersible polymer powder Acronal ® S695P | 0.25% |
| Redispersible polymer powder Acronal ® S629P | 0.25% |
| Redispersible polymer powder Acronal ® S631P | 0.25% |
| Redispersible polymer powder Acronal ® DS5006x | 0.25% |

2% of dedusting composition was added to a Portland cement CEM I 32.5 from Heidelberger Cement (type "Milke"). The flowability of the cement does not suffer as a result. A tile cement formulation (cf. page 23a in the patent) in which 35% of this dedusted cement is used can be completely dedusted with this powder.

2% of dedusting composition was likewise added to quartz sand F34 (0.063-0.4 mm fineness). The tile cement formulation can also be completely dedusted thereby.

Non-hydrophobized silica can be impregnated with a high proportion of dedusting composition. This leads to granulation of the very light silica powder. 34 g of dedusting composition could be added to 10 g of the silica Aerosil 300 from Degussa. This gives a flour-like powder. On addition of 5.6 g of this powder, 135 g of the above tile cement formulation could be dedusted.

Testing of the influence of the dedusting composition on the blocking properties of redispersion powder:

In this test, the influence of the dedusting composition on the blocking properties during dedusting of a redispersion powder (Acronal® S695P) was measured. For this purpose, a very high dose of the dedusting composition according to Example 2 was chosen (>3% by weight) in order to estimate the limits:

3.25 g and 5 g of dedusting composition were added to 100 g of polymer powder. The samples were introduced into a 50 ml glass container, loaded with an 800 g weight and stored at a temperature of 60° C. in a drying oven for 24 h and 72 h, respectively. Thereafter, the compacting of the sample was assessed. After storage at that temperature for 24 h and 72 h, respectively, the powder sample with 3.25 g shows only slightly increased compacting phenomena compared with the comparative sample which has not been dedusted.

On addition of 5 g of dedusting composition, there is a transition to a pasty material, which may be of interest for further applications. This product is not suitable for investigating the compacting.

Influence of the dedusting composition on the particle size distribution 2.2% of dedusting composition were added to a representative sample of 200 g of redispersible polymer powder (Acronal® S695P).

The particle distribution was investigated in comparison with a sample without dedusting composition by means of the Coulter counting method.

After the dedusting, there were virtually no longer any particles in the range of 0.1-5 µm. In the range of 5-10 µm, the number of particles was substantially reduced compared with the sample which has not been dedusted.

We claim:

1. An additive comprising an isoalkane mixture that comprises a hydrocarbon having from sixteen to twenty carbon atoms, wherein the $^1$H-NMR spectrum of the isoalkane mixture has an area integral of from 25 to 70%, based on the total integral area, in the range of a chemical shift δ of from 0.6 to 1.0 ppm, based on tetramethylsilane.

2. The additive according to claim 1, wherein, the $^1$H-NMR spectrum of the isoalkane mixture has an area integral of from 30 to 60%, based on the total area integral, in the range of a chemical shift δ of from 0.6 to 1.0 ppm.

3. The additive according to claim 1, wherein the isoalkane mixture has a degree of branching V in the range of from 0.1 to 0.35.

4. The additive according to claim 1, wherein the isoalkanes of the isoalkane mixture have substantially no tert-butyl groups.

5. The additive according to claim 1, wherein the isoalkane mixture further comprises at least one of a hydrocarbon having eight carbon atoms and a hydrocarbon having twelve carbon atoms.

6. The additive according to claim 1, wherein the isoalkane mixture is obtained by a process comprising
oligomerizing a hydrocarbon starting material comprising at least one olefin having 2 to 6 carbon atoms over a transition metal-comprising catalyst to obtain an oligomerization product, and, thereafter,
hydrogenating the oligomerization product obtained from said oligomerizing to obtain the isoalkane mixture.

7. The additive according to claim 6, wherein the process further comprises separating the oligomerization product obtained from said oligomerizing, separating the hydrogenation product obtained from said hydrogenating, or both.

8. The additive according to claim 6, wherein the hydrocarbon starting material comprises a mixture of at least 80% by weight, based on the total olefin content, of linear olefins.

9. The additive according to claim 6, wherein the hydrocarbon starting material further comprises a $C_4$-hydrocarbon mixture.

10. The additive according to claim 6, wherein the transition metal-comprising catalyst comprises a heterogeneous catalyst comprising nickel.

11. A redispersible powder comprising the additive according to claim 1.

12. A process, comprising: contacting a construction chemistry product with the additive according to claim 1.

13. A process for the preparation of the additive according to claim 1 comprising:
oligermizing a hydrocarbon starting material comprising at least one olefin having 2 to 6 carbon atoms over a transition metal-comprising catalyst, and, thereafter,
hydrogenating the oligomerization product obtained from said oligomerizing to obtain the isoalkane mixture, to obtain the isoalkane mixture.

14. The process according to claim 13, wherein said oligomerizing is carried out at a temperature of from about 20 to 280° C. and a pressure of from 1 to 300 bar.

15. The process according to claim 13, wherein the hydrocarbon starting material is in a supercritical state.

16. The process according to claim 13, wherein the transition metal-comprising catalyst comprises a heterogeneous catalyst comprising nickel.

17. The process according to claim 13, wherein the transition metal-comprising catalyst comprises silica, from 10 to 70% by weight of nickel oxide, from 5 to 30% by weight of titanium oxide, zirconium dioxide, or both, and from 0 to 20% by weight of alumina.

18. The process according to claim 13, wherein said hydrogenating is carried out in the presence of a catalyst comprising palladium.

19. The process according to claim 13, wherein said hydrogenating is carried out at a temperature of from 20 to 250° C. and at a pressure of from 1 to 300 bar.

20. The additive according to claim 1, wherein the isoalkane mixture has a flash point of at least 100° C.

* * * * *